United States Patent

Sakurai et al.

[11] 4,055,831
[45] Oct. 25, 1977

[54] SYSTEM FOR INDICATING INTERRUPTION IN OPERATION OF AUTOMOTIVE LAMPS

[75] Inventors: Yasuhiko Sakurai; Toshio Ishida; Teruo Kusumoto, all of Kariya, Japan

[73] Assignee: Nippondenso Co., Ltd., Kariya, Japan

[21] Appl. No.: 639,347

[22] Filed: Dec. 10, 1975

[30] Foreign Application Priority Data

Dec. 11, 1974 Japan .................. 49-150571

[51] Int. Cl.$^2$ ............................................. B60Q 1/26
[52] U.S. Cl. .......................................... 340/80; 340/79; 340/81 R; 340/251; 315/82
[58] Field of Search .............. 340/81 R, 81 F, 80, 340/251, 79; 315/82, 77, 83

[56] References Cited

U.S. PATENT DOCUMENTS

| | | | |
|---|---|---|---|
| 3,623,055 | 11/1971 | Sakurai | 340/251 |
| 3,811,107 | 5/1974 | Sakurai | 340/81 F |
| 3,868,628 | 2/1975 | Sakurai | 340/81 F |
| 3,956,733 | 5/1976 | Sakurai | 340/81 R |

Primary Examiner—John W. Caldwell
Assistant Examiner—Donnie L. Crosland
Attorney, Agent, or Firm—Cushman, Darby & Cushman

[57] ABSTRACT

A current winding is connected between an electric current source and automotive lamps for generating a magnetomotive force in response to the amount of current flowing therethrough. A voltage winding is connected in parallel with the combination of the current winding and the automotive lamps for generating an opposite magnetomotive force to that of the current winding. A reed switch is disposed adjacent the current and the voltage windings and is energized to close or open by the net magnetomotive force of the two windings. An indicating lamp is operatively related to the reed switch so as to be energized when the net magnetomotive force becomes lower than a predetermined value because of the interruption in operation of at least one of the lamps. A zener diode is further connected in series with the voltage winding in order to enable indication of the interruption when all of the automotive lamps are inoperative.

2 Claims, 2 Drawing Figures

SYSTEM FOR INDICATING INTERRUPTION IN OPERATION OF AUTOMOTIVE LAMPS

BACKGROUND OF THE INVENTION

1. Field of the Invention

The present invention relates to a indicating system for automotive lamps for informing a driver of the inoperativeness of one or more lamps.

2. Description of the Prior Art

In a conventional indicating system of this kind, for example as exemplified in the U.S. Pat. No. 3,868,628, which granted on Feb. 25, 1975 to Yasuhiko Sakurai, a current winding is connected between a current source and a plurality of automotive lamps and a voltage winding is connected between the current source and ground for generating an opposite magnetomotive force to that of the current winding. A lamp interruption is detected in such a manner that a relay is energized to light an indicating lamp when the net magnetomotive force of the two windings exceeds a predetermined value.

However, the conventional system just described sometimes fails to indicate lamp interruption when all of the lamps are inoperative, since the magnetomotive force of the voltage winding in itself is still large enough to maintain the relay at its normal condition.

SUMMARY OF THE INVENTION

It is, therefore, an object of the present invention to provide a system for automotive lamps which indicates lamp interruption even when all of the lamps are inoperative.

It is another object of the present invention to provide an indicating system which can operate over a wide range of voltage variations of the current source.

These and other objects of the present invention will become apparent by reference to the following description, taken in connection with the accompanying drawings.

DETAILED DESCRIPTION OF THE PREFERRED EMBODIMENT

Figure 1:
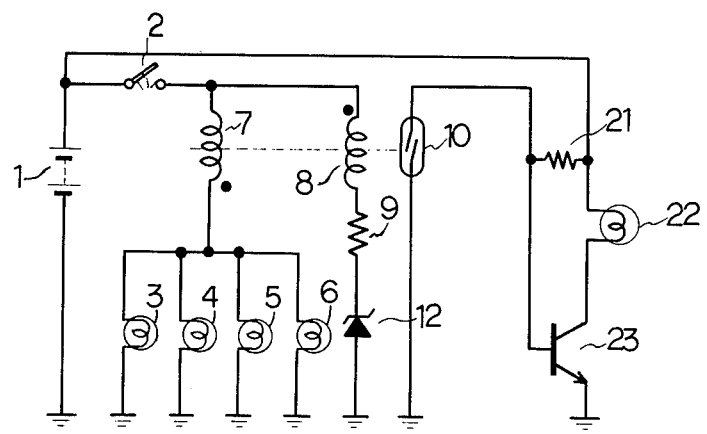
FIG. 1 shows an electric wiring diagram of an indicating system according to the present invention.

In FIG. 1, a lamp switch 2 is connected to a battery 1 mounted in an automotive vehicle, and also to a plurality of automotive lamps 3, 4, 5 and 6 through a current winding 7. A series circuit comprising a voltage winding 8, a resistor 9 and a zener diode 12 (connected at its cathode to the resistor 9 and at its anode to the ground) is connected in parallel with winding 7 and lamps 3-6. The voltage winding generates a magnetomotive force opposite to that of the current winding 7 when the windings are energized. A reed switch 10 disposed adjacent to the two windings, closes its contacts when the net magnetomotive force of the current winding 7 and the voltage winding 8 exceeds a predetermined value. The reed switch 10 is connected across the battery 1 through a resistor 21. A junction between the resistor 21 and the reed switch 10 is connected to a base of a switching transistor 23 having a collector-emitter path connected across the battery through indicating means such as lamp 22.

Figure 2:
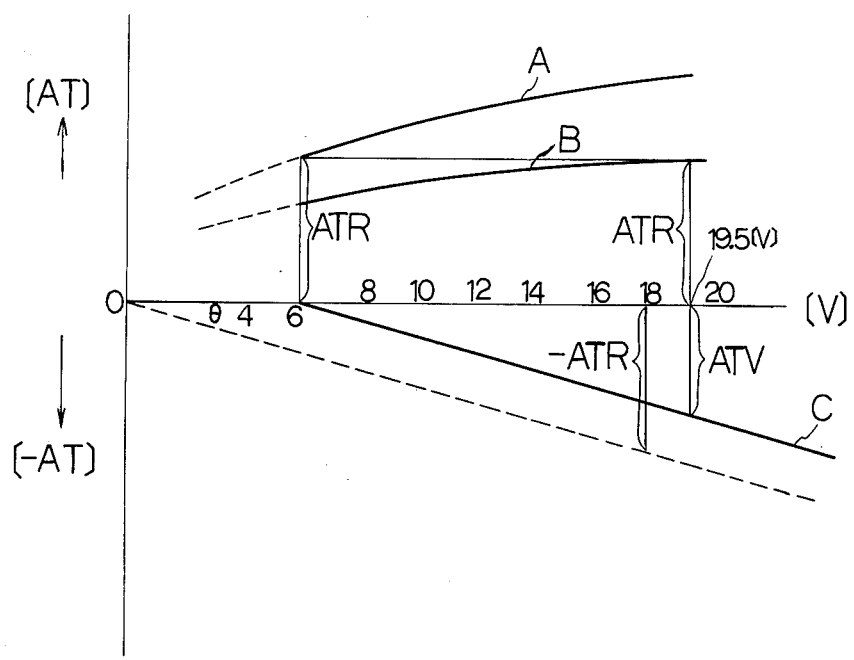
FIG. 2 is a diagram showing voltage-current characteristics of lamps.

To facilitate the understanding of the invention, FIG. 2 is presented. However, it should be understood that the particular plot illustrated in FIG. 2 is achieved with an exemplary set of circuit parameters. The invention itself can be carried out with a wide variety of such parameters, and therefore, it must be appreciated that the specific example in FIG. 2 is merely a representative one for illustrative purposes.

Referring more specifically to FIG. 2, the plot has an abscissa the voltage V of a battery corresponding to battery 1 in FIG. 1. The ordinates AT and −AT of the plot represent the net magnetomotive force (in ampere-turns) developed by current flow through the current winding 7 and/or the voltage winding 8 illustrated in FIG. 1. Solid line A represents the net magnetomotive force achieved with all of the lamps 3-6 in FIG. 1 operating as voltage V varies, while line B indicates the net magnetomotive force with one of the lamps being inoperative. The solid line C represents the net magnetomotive force developed by voltage winding 8 when all of the lamps 3-6 are inoperative and when winding 8 is connected in series with a zener diode 12. The parameters of the reed switch 10 dictate the amount of magnetomotive force required for it to switch from one state to another, and in the circuit operation plotted in FIG. 2, these values are represented by ATR and −ATR. The value ATV is merely an indication of the net magnetomotive force developed by the voltage winding 8 with lamps 3-6 inoperative and with voltage V equal to 19.5 volts. The dotted line which parallels line C represents what the net magnetomotive force would be with lamps 3-6 inoperative and the zener diode 12 eliminated, and the angle $\theta$ represents the rate of increase of the magnetomotive force produced by winding 8 under these conditions. Obviously, this angle $\theta$ is a function of the parameters of the circuitry involved.

In operation, when the lamp switch 2 is closed, electric current flows from the battery 1 through the lamp switch 2, the current winding 7, and the plurality of automotive lamps 3, 4, 5 and 6, to thereby cause them to light. At the same time, the current winding 7 generates a magnetomotive force and the voltage winding 8 also generates a magnetomotive force opposite to that of the current winding 7. The combined (net) magnetomotive force of the above two windings 7 and 8 acts on the reed switch 10.

When all of the lamps 3, 4, 5 and 6 are normally lit by the closure of the lamp switch 2, the reed switch 10 is energized to close its contacts since the net magnetomotive force of the two windings 7 and 8 acting thereon is sufficiently large as will be described with reference to solid line A in FIG. 2.

As stated previously, in FIG. 2, the solid line A indicates a characteristic curve of the net magnetomotive force (AT) in ampere-turns for variations in the battery voltage V when all of the lamps 3 through 6 are normally operated. It should be noted that the net magnetomotive force designated by the line A exceeds the predetermined value (indicated by ATR), above which the reed switch 10 is closed, whenever the voltage of battery 1 is above 6.0 volts. Under these conditions, the indicating means 22 can not be energized.

However, when one of the automotive lamps 3 through 6 is rendered inoperative, the net magnetomotive force is decreased below the predetermined value ATR as indicated by a solid line B, whereby the reed switch 10 is opened. When the reed switch 10 is opened, the transistor 23 is supplied with base current through the resistor 21, resulting in transistor conduction so that the indicating lamp 22 is lit to inform a driver in a motor vehicle of inoperativeness of the lamp.

As noted from FIG. 2, the more the battery voltage increases, the larger the net magnetomotive force becomes. When the battery voltage exceeds 19.5 volts, the reed switch 10 is no longer kept opened when one of the lamps is inoperative since the net magnetomotive force is higher than ATR when the battery voltage is above 19.5 volts. Therefore, the inoperativeness of one lamp can be appropriately detected in the voltage range from 6.0 volts to 19.5 volts.

On the other hand, when all of the automotive lamps 3 through 6 are inoperative, no current flows through the current winding 7. Under these circumstances, only the magnetomotive force generated at the voltage winding 8 acts on the reed switch 10.

If a zener diode 12 is not provided, the voltage winding 8 would generate the magnetomotive force as indicated by a dotted line in FIG. 2, whereby the reed switch 10 would be closed when the battery voltage is higher than 18.0 volts. Thus, above this level no indication by lamp 22 would occur even though all of the lamps are inoperative.

If the angle $\theta$ of the dotted line were to be reduced to overcome the above defect, the magnetomotive force generated at the voltage winding would become smaller than ATR above the battery voltage of 19.5 volts, so that interruption of all of the lamps would be detected. However, the decrease of the angle $\theta$ would cause an increase of the gradient of the net magnetomotive force when one or more lamps are operative, which would result in the detecting range for one-lamp inoperativeness becoming smaller. Accordingly, it is apparent that the larger the angle $\theta$ becomes, the wider the detecting range for one-lamp inoperativeness extends.

Based on the this fact, in the present invention the zener diode 12 is provided in series with the voltage winding 8 as shown in FIG. 1, the diode being brought into conduction when the voltage drop thereacross becomes higher than 6.0 volts.

Provision of the zener diode 12 makes it possible for the angle $\theta$ of the line obtained by the voltage winding to be maintained as shown by solid line C in FIG. 2, which limits the magnetomotive force to the level ATV which is less than ATR when the battery voltage is around 19.5 volts. Therefore, the inoperability of all of the lamps can be detected in the wide range of battery voltage variations from 6.0 volts to 19.5 volts while allowing the inoperability of one lamp to be detected in this voltage variation range.

In the present invention, a series connection of a plurality of diodes with polarities opposite to the zener diode 12 can serve as a replacement for the zener diode 12.

What we claim is:

1. A system for indicating interruption in operation of automotive lamps comprising;

a voltage source;

a plurality of automotive lamps;

a switch and a current winding connected between said source and said automotive lamps, said switch being operable to connect said source to the lamps for energization thereof and for passing current through said winding thereby generating magnetomotive force in proportion to the amount of current flowing therethrough;

a voltage winding connected to said source via said switch for generating a magnetomotive force opposite to that generated by said current winding;

a zener diode connected in series with said voltage winding for allowing current to flow from the source through said voltage winding only when voltage applied across said diode exceeds a predetermined value;

additional switch means actuated in response to the net magnetomotive force generated by said windings; and indicating means connected to said additional switch means and responsive to the actuation of said additional switch means when at least one of said lamps is inoperative.

2. A system for indicating interruption in operation of automotive lamps comprising:

a voltage source;

a plurality of automotive lamps connected in parallel with each other;

indicating means;

a current winding connected between said source and said lamps for generating a magnetomotive force in response to energization by said source;

a voltage winding connected in parallel with a circuit comprising said current winding and said automotive lamps, said voltage winding being responsive to energization by the source for generating an opposite magnetomotive force to that generated by said current winding;

a zener diode connected in series with said voltage winding allowing current to flow from the source through said voltage winding only when voltage across said diode exceeds a predetermined value; and relay contacts operatively related to said source and the indicating means, said contacts being responsive to combined magnetomotive forces generated by said windings below a predetermined level for causing said indicating means to be energized.

* * * * *